UNITED STATES PATENT OFFICE.

ADALBERTO GARELLI, OF MILAN, ITALY.

STARTING DEVICE FOR ENGINES OF MOTORCYCLES.

1,366,531.　　　　　Specification of Letters Patent.　　Patented Jan. 25, 1921.

Application filed April 30, 1919. Serial No. 293,773.

*To all whom it may concern:*

Be it known that I, ADALBERTO GARELLI, subject of the King of Italy, residing at Milan, Italy, have invented certain new and useful Improvements in Starting Devices for Engines of Motorcycles, of which the following is a specification.

This invention relates to starting devices for motor cycles and like vehicles and has for its object a device of this kind in which the starting thrust is exerted on a member which operates the secondary or driven shaft of the change speed gear, thus allowing of reducing the transmission ratio between coöperating starting members as well as size thereof and of inclosing the same within said change speed gear box.

Figure 1:
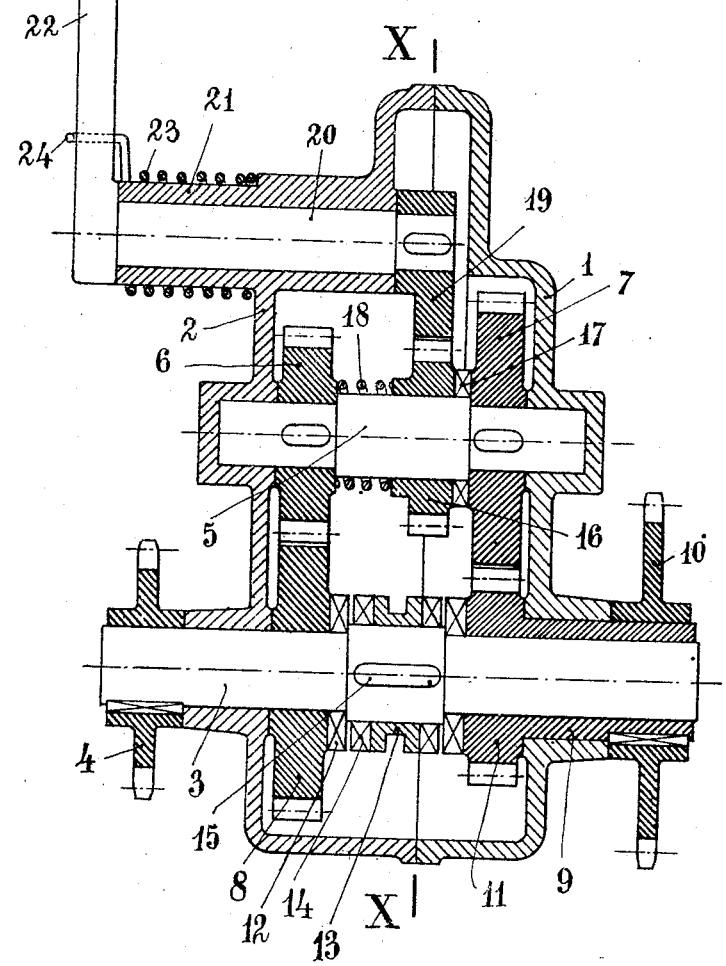
Figure 2:
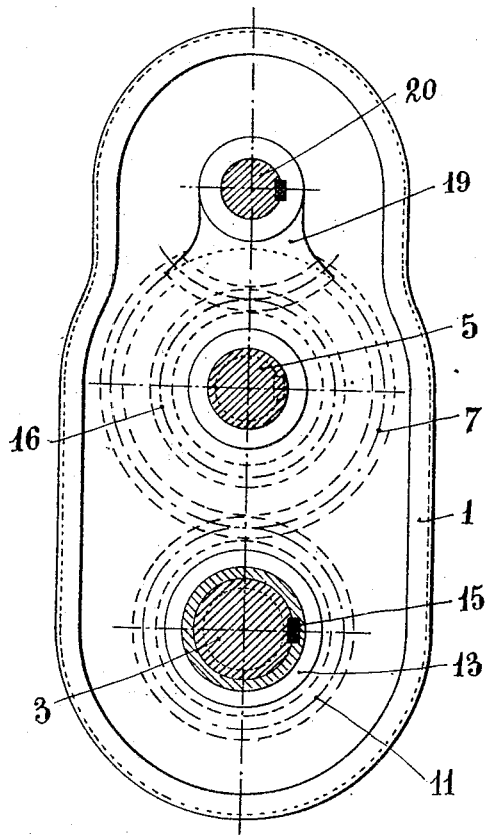

The annexed drawing shows a construction of a change speed gear provided with the device according to this invention, Figure 1 being a transverse section through the center lines of the main and secondary shafts of the speed change gear box; Fig. 2 is a section on line $x$—$x$ Fig. 1.

As shown in said drawing the change speed gear comprises a casing made of two sections 1 and 2 in which are journaled the main shaft 3 having fixed to it a pinion 4 for driving the vehicle wheels and a secondary shaft 5 having fixed to it pinions 6 and 7 the same being located near the ends of said shaft so as to leave a free space therebetween.

Loose on said shaft 3 are mounted a pinion 8 meshing with pinion 6 and a sleeve 9 having a pinion 10, located outside of said box to receive the engine drive, and a pinion 11 meshing with pinion 7.

Pinion 8 and sleeve 9 are provided with front teeth or projections 12 and either of them may be coupled to shaft 3 by means of a sleeve 13 having it opposite faces provided with teeth 14 and adapted to be shifted by any proper means not shown, said sleeve being coupled to rotate with shaft 3 by means of a key 15 or the like.

As will be obvious by engaging sleeve 13 with sleeve 9 the shaft 3 and pinion 4 are connected therewith and with pinion 10 driven by the engine; on the contrary by engaging sleeve 13 with pinion 8 the drive is obtained by the intermediary of pinion 10, sleeve 9, pinions 11—7, shaft 5, pinions 6 and 8 and shaft 3, said shaft 3 being coupled to pinion 8 by the described coöperating engagement of teeth 14 and 12 of sleeve 13 and pinion 8, and thus a different transmission ratio between pinions 10 and 4 is obtained.

The construction and operation of change speed gear are described merely for purpose of clearness, and the same do not form a feature of this invention which consists in the starting device as hereinafter described and pointed out in appended claims.

The starting device comprises a pinion 16 loosely mounted on shaft 5 between pinions 6 and 7 and having ratchet or screw front teeth 17 engaging corresponding ratchet or screw front teeth provided on said pinion 7, a spring 18 located between pinions 6 and 16 acting to hold the pinion 16 with its teeth 17 in engagement with those of pinion 7.

In a bearing 21 integral with casing section 2 is journaled a shaft 20 having fixed to it a toothed quadrant 19 adapted to mesh with pinion 16 and drive it, said shaft being provided with handle or pedal 22 for operating it, and the projecting end 24 of a spring 23 engages said member 22 so as to hold it in the position by which quadrant 19 is out of mesh with pinion 16.

For starting the engine a thrust is exerted on member 22 so as to cause it to rotate against action of spring 23 and to carry its quadrant 19 into mesh with pinion 16 the rotation of said quadrant 19 being transmitted to pinion 7 owing to front teeth 17 which are inclined to engage pinions 16 and 7 in this direction and thus pinion 11, sleeve 9 and pinion 10 are operated, the last named part being connected with the engine shaft so as to drive it for producing its starting.

On member 22 being released, spring 23 acts to carry it into its ordinary position, this being allowed by the ratchet engagement between pinions 7 and 16, the latter being free of rotating with regard to pinion 7 in the proper direction.

In the known constructions in which the starting member or quadrant operates the main shaft of change speed gear or the engine shaft itself, said quadrant must have a large diameter with regard to that of the coöperating member mounted on either of said shafts in order to rotate the engine shaft through a few revolutions by the displacement of said quadrant which ordinarily has an extension of about 180°; on the contrary with the construction according to this invention the ratio between quadrant 19 and pinion 16 may be very much reduced as the angular displacement of shaft 5 is multiplied in its transmission to said engine shaft owing to the respective diameters of pinions 7 and 11 and of pinion 10 and the coöperating one on the engine shaft as these gears ordinarily operate to reduce the number of revolutions in the transmission of power from engine to wheel.

A further advantage secured by this construction is that said quadrant 19 and coöperating pinion 16, owing to the reduced size of the same, may be inclosed within the box of the change speed gear, this arrangement protecting them and insuring their lubrication; the thickness of said box does not have to be increased for this purpose as the space intermediate pinions 6 and 7 is utilized, this space being required for mounting and shifting sleeve 13 between pinions 8 and 11 coöperating with said pinions 6 and 7 respectively.

Obviously the construction of various parts may be modified according to circumstances and a loose pinion may be inserted between quadrant 19 and pinion 16 to reverse the rotation of this latter if required.

What I claim as my invention and desire to secure by United States Letters Patent is:—

1. An engine starting device for motorcycles, comprising in combination a main shaft embodying driving and driven portions in alinement with each other; a secondary shaft parallel with said main shaft; a starting shaft parallel with said main shaft; coöperating pinions on the driving and driven portions of said main shaft and on said secondary shaft forming a change-speed gear transmission; a gear having a one-way clutch connection with said secondary shaft; a toothed quadrant fixed to said starting shaft and movable into and out of mesh with said gear; and means for actuating said toothed quadrant.

2. An engine starting device for motorcycles, comprising in combination a main shaft embodying driving and driven portions in alinement with each other; a secondary shaft parallel with said main shaft; a starting shaft parallel with said secondary shaft; coöperating pinions on the driving and driven portions of said main shaft and on said secondary shaft forming a change-speed gear transmission; a gear having a one-way clutch connection with said secondary shaft and mounted on the same between two of the transmission pinions thereon; a toothed quadrant fixed to said starting shaft and movable into and out of mesh with said gear; and means for actuating said toothed quadrant.

3. An engine starting device for motorcycles, comprising in combination a main shaft embodying driving and driven portions in alinement with each other; a secondary shaft parallel with said main shaft; a starting shaft parallel with said secondary shaft; coöperating pinions on the driving and driven portions of said main shaft and on said secondary shaft forming a change-speed gear transmission; a gear loose on the secondary shaft between two of the pinions thereon, said loose gear being provided with clutch teeth for engagement with clutch teeth on the adjacent face of one of said pinions; a spring pushing said loose gear against the pinion provided with clutch teeth; a toothed quadrant fixed to said starting shaft and movable into and out of mesh with said gear; and means for actuating said toothed quadrant.

In testimony whereof I affix my signature.

ADALBERTO GARELLI.